No. 682,006. Patented Sept. 3, 1901.
I. G. WATERMAN.
ELECTRICAL CONTROL OF FLOW OF WATER TO BASINS OF WASHSTANDS OR LAVATORY BOWLS.
(Application filed Feb. 23, 1901.)
(No Model.) 3 Sheets—Sheet 1.
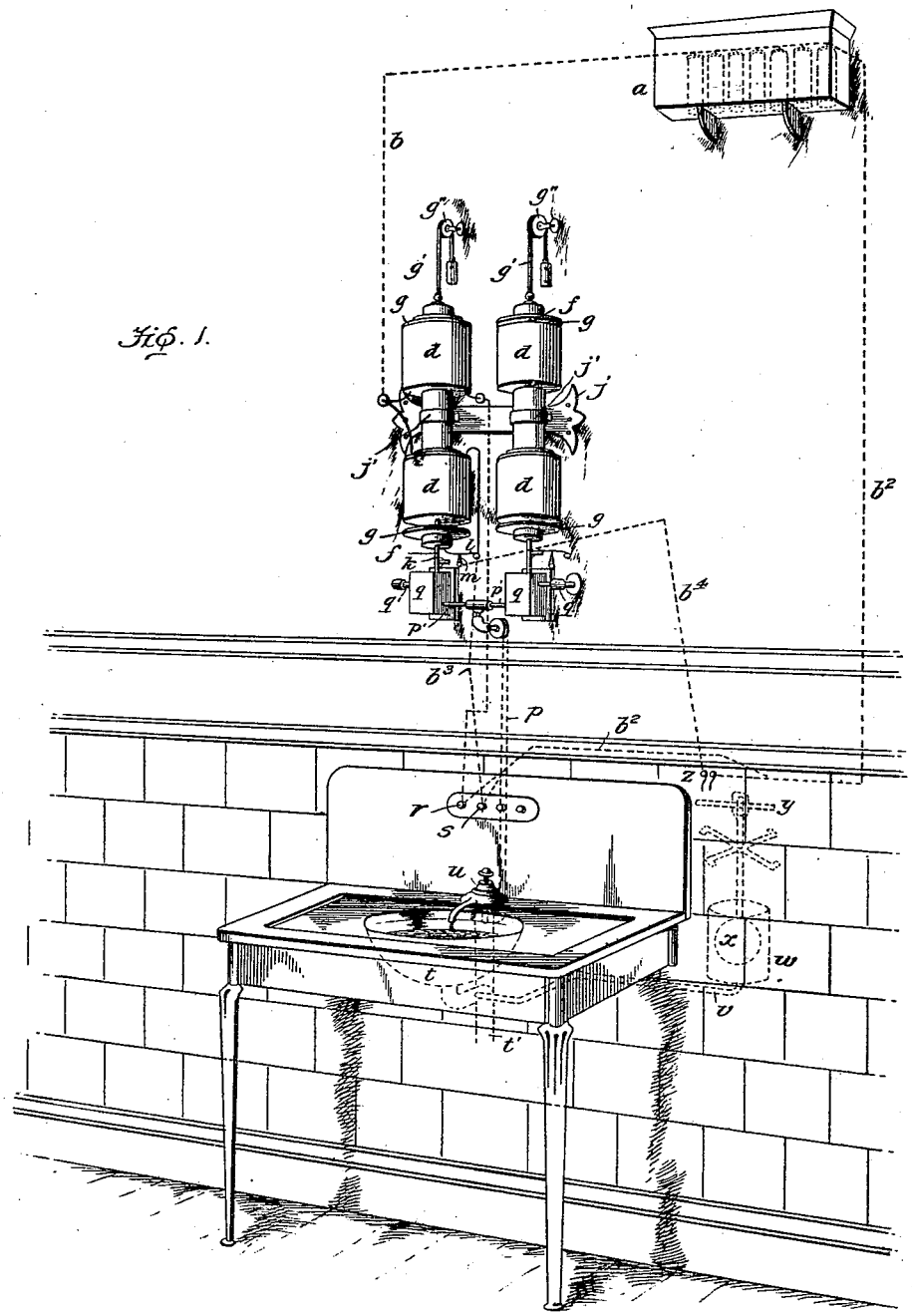

No. 682,006. Patented Sept. 3, 1901.
I. G. WATERMAN.
ELECTRICAL CONTROL OF FLOW OF WATER TO BASINS OF WASHSTANDS OR LAVATORY BOWLS.
(Application filed Feb. 23, 1901.)
(No Model.) 3 Sheets—Sheet 2.
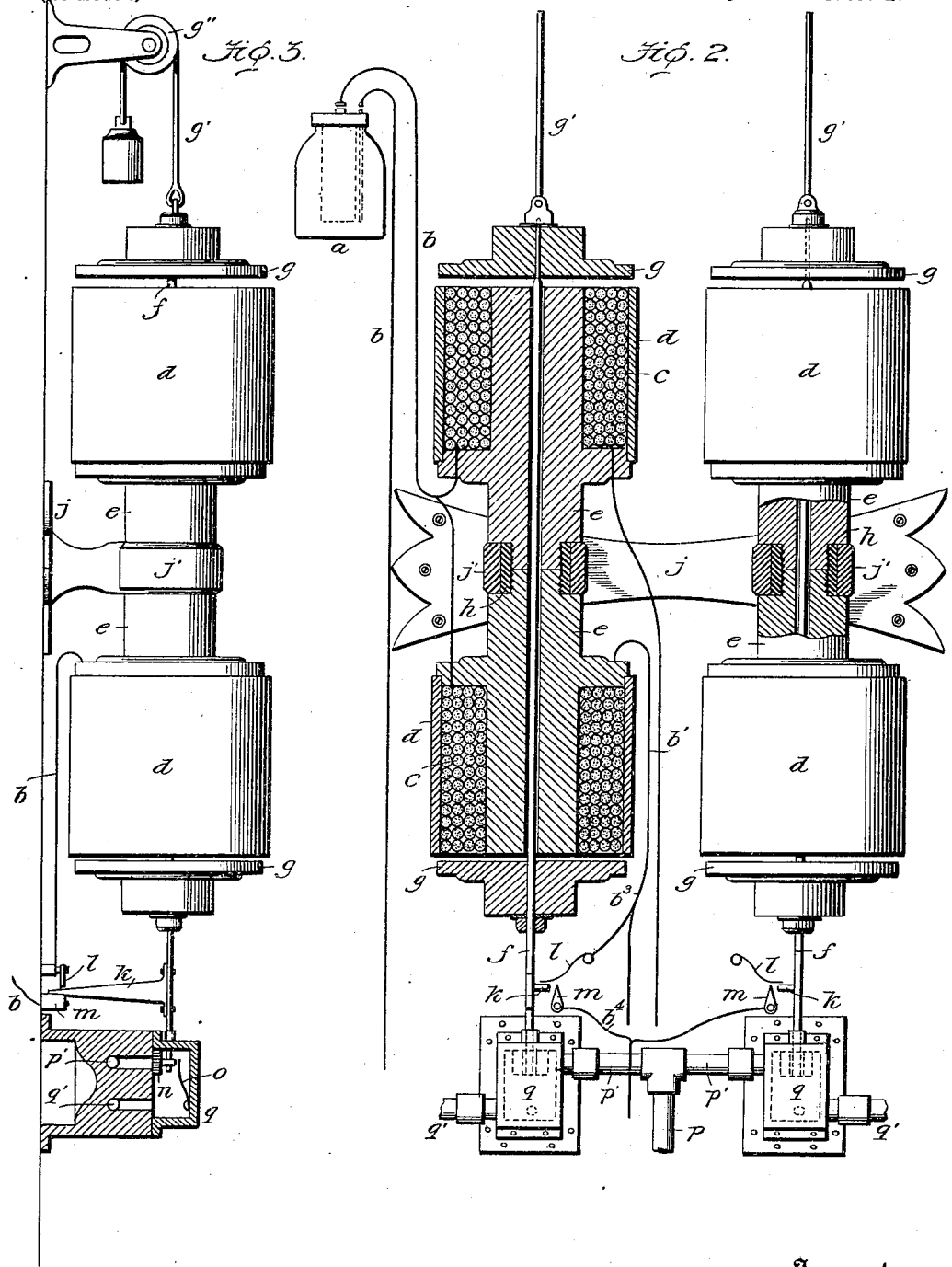
Witnesses
Inventor
Isaac G. Waterman
by Henry N. Copp
his Attorney No. 682,006. Patented Sept. 3, 1901.
I. G. WATERMAN.
ELECTRICAL CONTROL OF FLOW OF WATER TO BASINS OF WASHSTANDS OR LAVATORY BOWLS.
(Application filed Feb. 23, 1901.)

(No Model.) 3 Sheets—Sheet 3.

Witnesses

Inventor
Isaac G. Waterman
by Henry N. Copp
his Attorney

UNITED STATES PATENT OFFICE.

ISAAC G. WATERMAN, OF SANTA BARBARA, CALIFORNIA.

ELECTRICAL CONTROL OF FLOW OF WATER TO BASINS OF WASHSTANDS OR LAVATORY-BOWLS.

SPECIFICATION forming part of Letters Patent No. 682,006, dated September 3, 1901.

Application filed February 23, 1901. Serial No. 48,425. (No model.)

*To all whom it may concern:*

Be it known that I, ISAAC G. WATERMAN, a citizen of the United States, residing at the city of Santa Barbara, in the county of Santa Barbara and State of California, have invented certain new and useful Improvements in the Electrical Control of Flow of Water to Basins of Washstands or Lavatory-Bowls; and I do hereby declare the following to be a full, clear, and exact description of the invention, such as will enable others skilled in the art to which it appertains to make and use the same.

This invention relates to washstands or lavatory-bowls.

One object of the invention is the provision of improved means for electrically controlling the flow of water to the bowl or basin by the manipulation of switches or push-buttons, thereby rendering the admission and stoppage of the flow easy and expeditious.

Another object is to provide novel means for automatically and electrically cutting off the flow of water to the bowl when the water-level has reached a predetermined height, thereby preventing the waste of water or overflowing of the bowl.

Having the foregoing objects and others not specifically mentioned in view, the invention consists of certain novel features, combinations, and adaptations of parts set forth in detail hereinafter and recited in the claims hereto appended.

Figure 4:
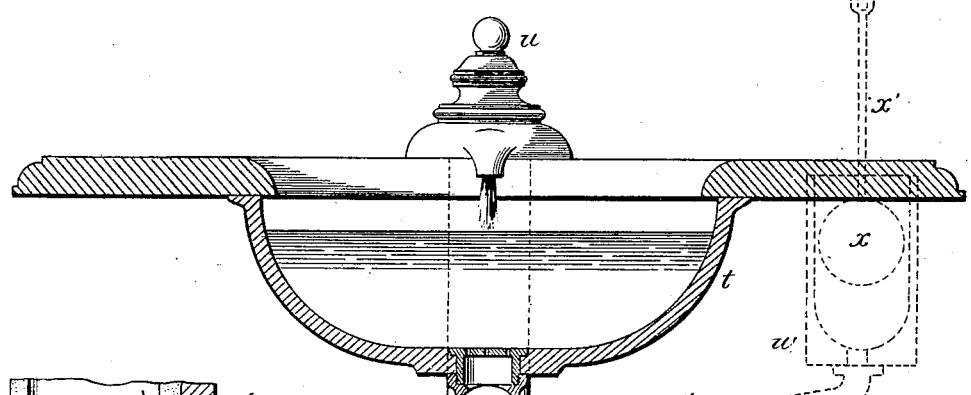
Figure 5:
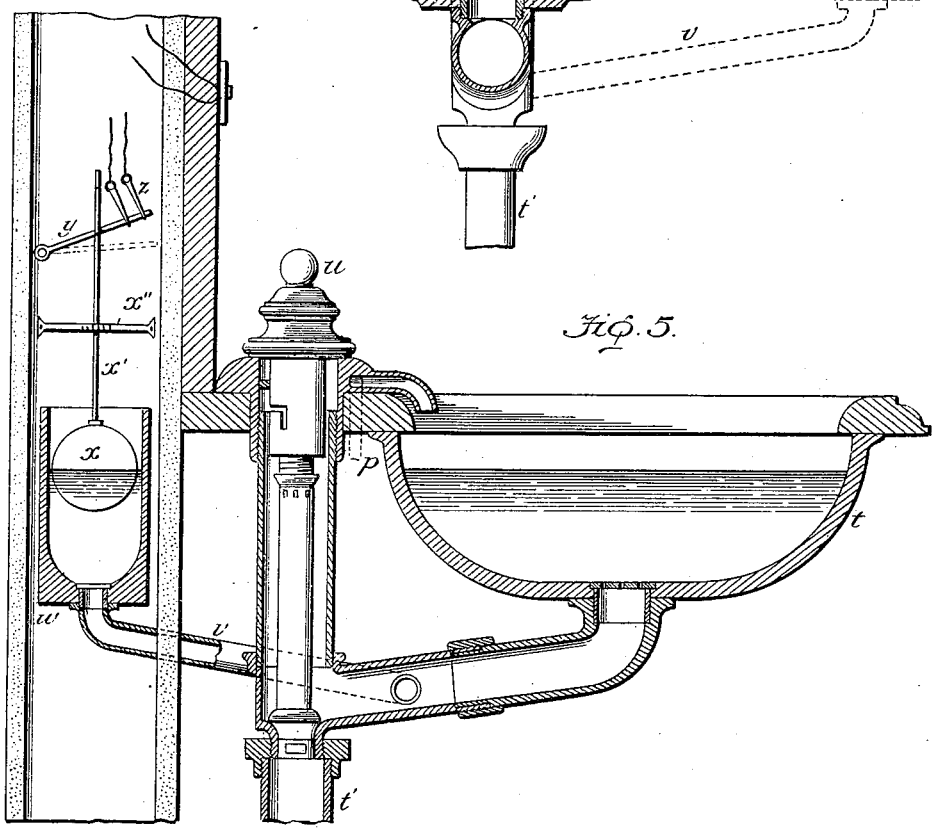

In the accompanying drawings, Figure 1 is a perspective view illustrating the apparatus in use; Fig. 2, a longitudinal sectional elevation of the magnets, showing other allied parts in full lines; Fig. 3, a side elevation of one pair of magnets, showing the valve-box in section; Fig. 4, a transverse section of the bowl with certain parts in dotted lines; and Fig. 5, a vertical section of the bowl, pipes, and tank.

The bowl or basin $t$ of the washstand is provided with a waste-pipe $t'$, whose vertical branch is closed by a suitable waste plug or stopper $u$. The water is delivered to the bowl by a pipe $p$, leading to a suitable faucet discharging thereinto. At some suitable point adjacent the bowl I locate a float-tank $w$, whose bottom is connected to the waste-pipe $t'$ or bowl above the plug by a pipe $v$. In the tank is a float $x$, having an upright stem or rod $x'$, guided by a suitable stationary bracket $x''$, which engages and carries with it in its up-and-down movements a pivoted circuit-making lever $y$, adapted to contact with electrical contact fingers or members $z$ and complete a circuit through them. The pipe $p$ is provided with branches $p'$, leading into valve-boxes $q$, which have the pipes $q'$ opening thereinto. One of these pipes $q'$ can be run to a source of cold-water supply and the other to a source of hot-water supply, whereby through the agency of my improved electrical controlling devices either hot or cold water, or both, can be supplied to the bowl $t$.

There are two electromagnetic devices for the separate control of the hot and cold water, and as they are duplicates and their electrical connections and operations are identical only one set will be described.

A bracket $j$, suitably secured to the wall, is provided, the same having collars $j'$, in which are fitted the reduced ends of upper and lower hollow electromagnet-cores $e\ e$, connected by a collar $h$. On the magnets are coils $c$, incased by shells $d$. Above the upper and below the lower magnet pole-pieces are armature-plates $g$, and these are connected by a rod $f$, extending through the hollow magnet-cores $e$, a counterbalancing-weight and cord $g'$ passing over a pulley $g''$, being connected to the upper armature-plate and adapted to maintain the armature-plates and parts carried thereby wherever positioned by the action of the magnets. On the lower end of the rod $f$ is a slide-valve $n$, located in the box $q$ and adapted to cover and uncover the port leading to pipe $p'$, and said valve is held or balanced on its seat by the water-pressure, assisted by a spring $o$. A contact-arm $k$ is carried by the rod $f$, and bearing on the top of said arm $k$ is a contact member $l$, connected to the wall, while below the arm, on the wall, is a contact member $m$. When the armature-rod is raised, the arm $k$ keeps the contact $l$ raised and out of contact with $m$, but when it is drawn down it allows $l$ and $m$ to come together.

An electric battery of a suitable number of cells is shown at $a$, from which the circuits run as follows: $b$ to upper and lower coils $c$, upper coils $c$, via $b'$ to push-button $r$, and via return-wire $b^2$ to battery $a$. Lower coil $c$, via wire $b^3$ to contact $l$, to bush-button $s$, and via $b^2$ to battery $a$. $m$, via wire $b^4$ to one of the contacts $z$, and from the other contact $z$ to $b^2$.

The operation is as follows: On pressing push-button $r$ the circuit through upper coil $c$ is completed, whereupon its core attracts upper armature-plate $g$, thus moving valve $n$ from the port leading to $p'$ and allowing the water to flow from pipe $q'$ into pipes $p'$ and $p$ and into the bowl. At the same time the contact $l$ is allowed to engage contact $m$, thus completing the circuit for the final automatic shut-off in case the flow is not otherwise stopped. As the armature plates and rod are balanced by the weight, they will remain where positioned, and hence the valve will remain open until the flow is automatically checked or push-button $s$ pressed. If button $s$ is pressed, the circuit will be completed through lower coil $c$, whose core will then draw up the lower armature-plate $g$ and close the valve, thus stopping the flow and also separating contacts $l$ and $m$. Should the water be left running, it will rise in tank $w$, lifting the float $x$ and gradually raising contact-lever $y$ until at a predetermined height of water-level in the bowl or basin the said lever will bridge the two contacts $z$, and by thus completing the circuit branch $b^4$ energize the lower coil $c$ and cause its core to draw up the armature-rod and close the valve $n$. In consequence it is impossible for the bowl to overflow if the water is left flowing, as the flow will be automatically stopped when a predetermined level is reached. The water will drain off from the bowl on opening the plug $u$ and the float $x$ will then fall to normal position.

The second set of electromagnetic apparatus and valve, of which the electrical connections are not shown, is employed for controlling the supply of hot water, its circuits and operation being the same as heretofore described, but entirely independent thereof, in consequence of which either hot or cold water can be separately directed into pipe $p$ or both hot and cold made to flow together therethrough.

I am aware that many changes of construction and operation and arrangement of circuits could be resorted to in carrying out my invention without detracting from any of its advantages or essentially altering its form or manner of acting, and I do not therefore limit myself to the precise constructions and arrangements herein shown and described, but consider myself entitled to all forms and modifications falling within the spirit and scope of the invention.

Having fully described my invention, what I claim as new, and desire to secure by Letters Patent, is—

1. In a device of the class described, the combination with a fluid-receptacle, a pipe adapted to supply the same, and a valve controlling the flow through the pipe, of a float-tank communicating with the receptacle, an electrically-controlled device for closing the valve, a float in said tank which has an upright stem, a guide for said stem, contact-fingers in circuit with the electrically-controlled device, and a pivoted lever actuated by the stem which is adapted to bridge the contact-fingers when raised to a predetermined height, whereby the circuit is closed and the electrically-controlled device energized to close the valve and cut off the fluid-supply.

2. In a device of the class described, the combination with a source of fluid-supply, and a valve controlling the flow of fluid, of independent electrically-controlled devices, one adapted to open the valve, and the other to close the valve, an independent circuit and embraced circuit closer for the valve-opening device, an independent circuit and embraced circuit closer for the valve-closing device, a circuit which is automatically completed, in part, when the valve is opened, and an independent automatic circuit-closer in the last-named circuit and in circuit with the valve-closing device which automatically closes its circuit at a predetermined time and thus energizes the valve-closing device to close the valve.

In testimony whereof I affix my signature in presence of two witnesses.

ISAAC G. WATERMAN.

Witnesses:
H. C. BOOTH,
C. F. EBERLE.